(12) United States Patent
Johnson et al.

(10) Patent No.: US 7,647,373 B2
(45) Date of Patent: Jan. 12, 2010

(54) SYSTEM AND PROCESS FOR NETWORK COLLABORATION THROUGH EMBEDDED ANNOTATION AND RENDERING INSTRUCTIONS

(75) Inventors: Stephen Johnson, Alexandria, VA (US); Cecil V. Hornbaker, III, Apopka, FL (US)

(73) Assignee: ePlus Capital, Inc., Herndon, VA (US)

( * ) Notice: Subject to any disclaimer, the term of this patent is extended or adjusted under 35 U.S.C. 154(b) by 1482 days.

(21) Appl. No.: 09/804,074

(22) Filed: Mar. 13, 2001

(65) Prior Publication Data

US 2003/0023679 A1 Jan. 30, 2003

(51) Int. Cl.
*G06F 15/16* (2006.01)

(52) U.S. Cl. .............. 709/204; 709/205; 709/203; 709/246; 709/219; 715/232; 715/233; 715/230

(58) Field of Classification Search ......... 709/201–205, 709/219, 300, 231, 232, 237, 246, 719; 717/512, 717/513, 501; 117/501, 512, 513; 715/515, 715/512, 523, 230, 232, 233
See application file for complete search history.

(56) References Cited

U.S. PATENT DOCUMENTS

| | | | |
|---|---|---|---|
| 5,553,281 A | 9/1996 | Brown et al. | |
| 5,600,775 A | 2/1997 | King et al. | |
| 6,018,738 A * | 1/2000 | Breese et al. | 707/100 |
| 6,105,055 A | 8/2000 | Pizano et al. | |
| 6,144,991 A * | 11/2000 | England | 709/205 |
| 6,342,906 B1 * | 1/2002 | Kumar et al. | 715/751 |
| 6,360,236 B1 * | 3/2002 | Khan et al. | 715/526 |
| 6,453,333 B1 * | 9/2002 | Glynias et al. | 709/202 |
| 6,546,405 B2 * | 4/2003 | Gupta et al. | 715/512 |
| 6,549,944 B1 * | 4/2003 | Weinberg et al. | 709/224 |
| 6,640,241 B1 * | 10/2003 | Ozzie et al. | 709/204 |
| 6,687,876 B1 * | 2/2004 | Schilit et al. | 715/512 |
| 6,687,878 B1 * | 2/2004 | Eintracht et al. | 715/512 |
| 6,877,137 B1 * | 4/2005 | Rivette et al. | 715/512 |
| 2001/0001864 A1 | 5/2001 | Page et al. | |
| 2001/0016872 A1 * | 8/2001 | Kusuda | 709/205 |

* cited by examiner

*Primary Examiner*—Nathan Flynn
*Assistant Examiner*—Mohammad A Siddiqi
(74) *Attorney, Agent, or Firm*—Stephen Gigante; Cha & Reiter, LLC

(57) ABSTRACT

A process for network collaboration using embedded annotations and rendering instructions allowing collaborators to generate, share, and render collaborative content over the internet without installing any applications other than a web browser is disclosed, which allows the recipients of such collaborative content to view the content without installing any application other than the web browser. The message containing collaborative content sent between collaborators is a URL and collaborative content elements, which not only contain the identity of the base document, but an encoded representation of the collaborative content itself. These URLs are self-contained, and can be distributed using synchronous or asynchronous messaging systems.

40 Claims, 8 Drawing Sheets

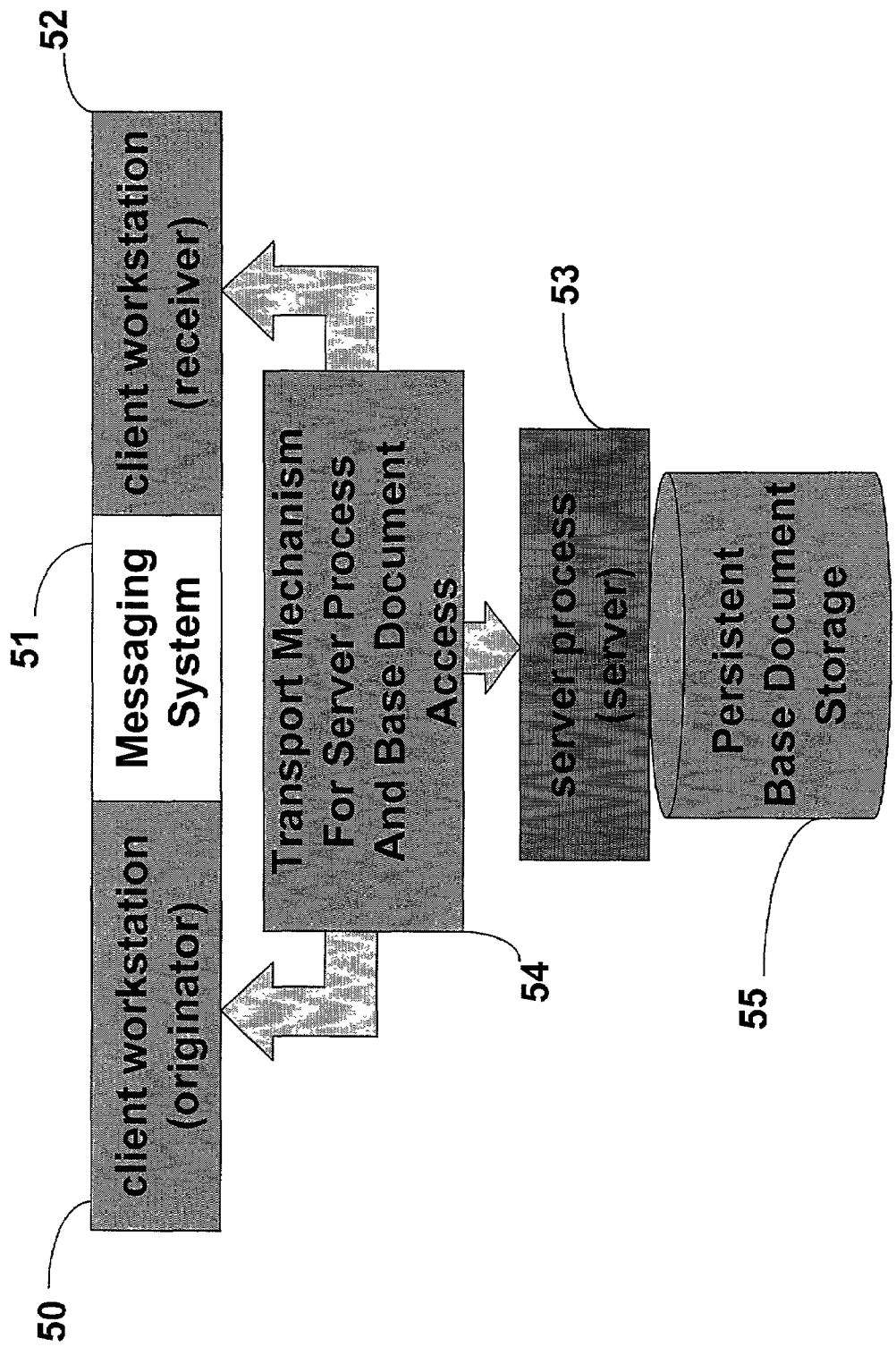
Figure 2: Conceptual Schematic (Server Model)

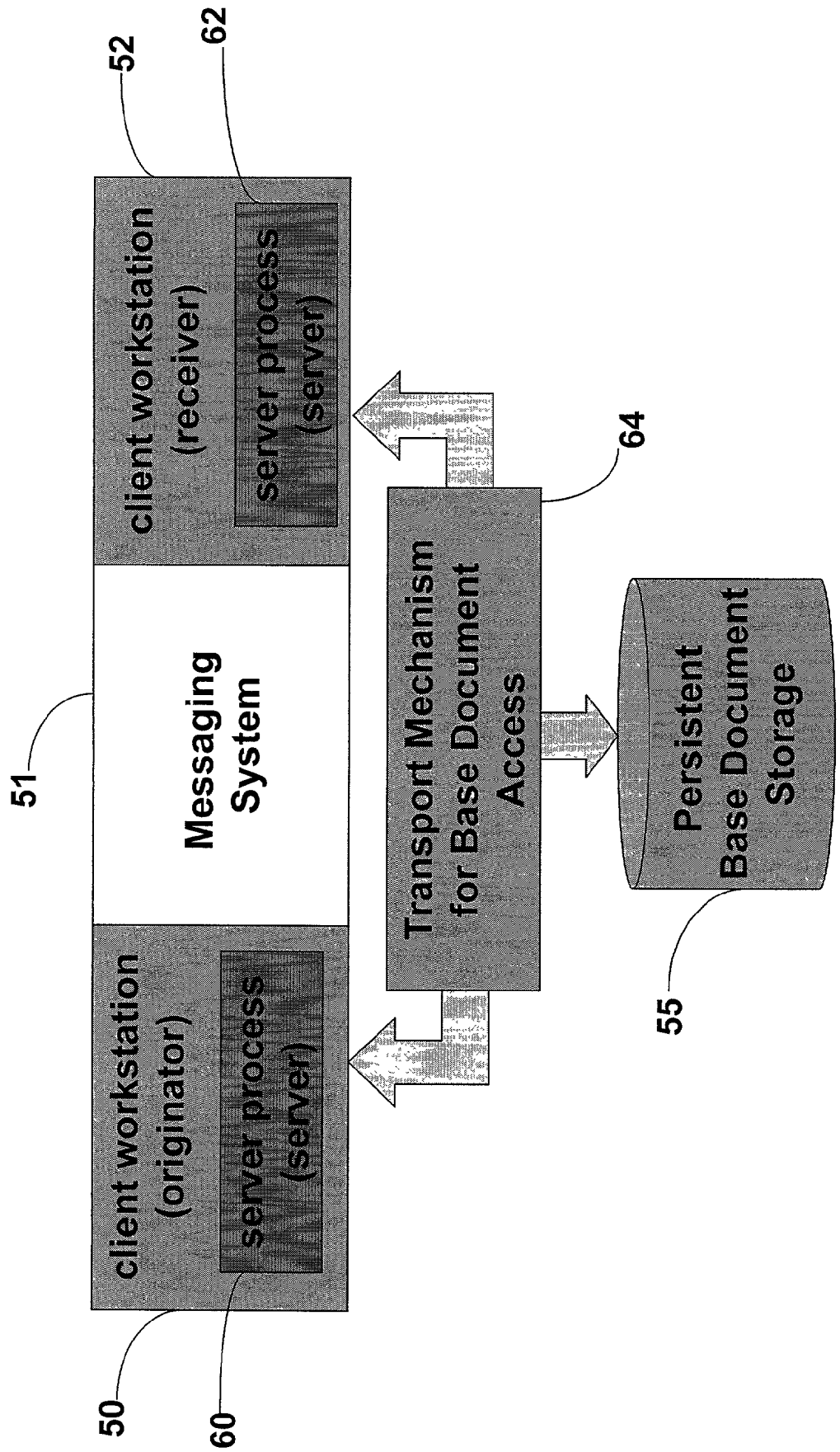
Figure 3: Conceptual Schematic (Peer-to-Peer Model)

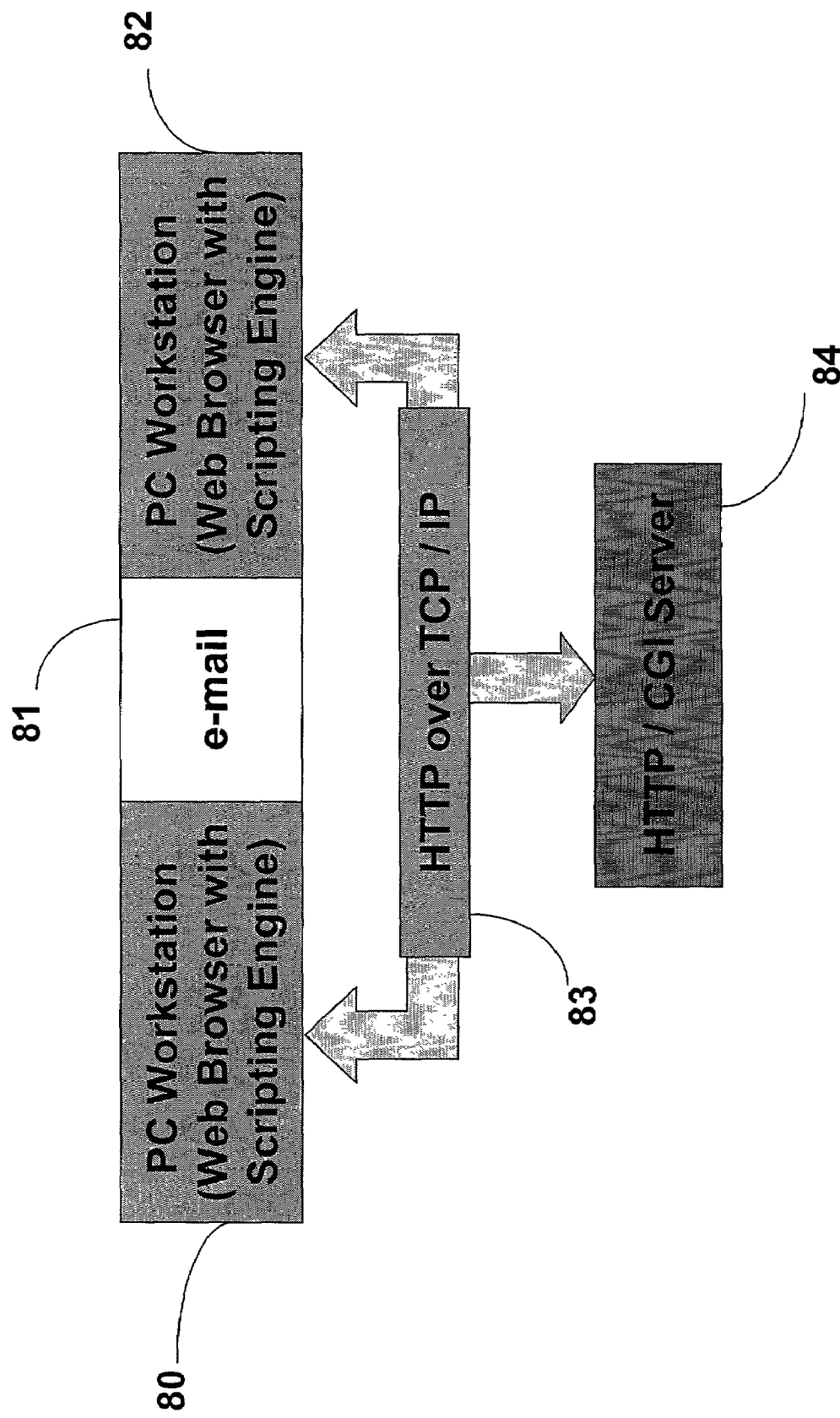
Figure 4: Preferred Embodiment: Block Diagram

Figure 5: Preferred Embodiment: Collaborative Content
(Represented by URL and XML)

Listing 1: URL Part One -- Document, Zoom Level, and Position
http://localhost/dpr/ds.dpv/00016J/1/123?dpv=bt7dc0dm1dn1do1e0h5i6800j4400k256l0n-2441o-25p1r0s33st0tt0tt0w7x896xm0xt7y640ym0yt5&DPDB_IDNT=/GIBBS/00016J/1&DPDB_SH=04131

Listing 2: URL Part Two -- Markup Consisting of Circle, Arrow, and Text Box
&_RCR=circle|2140|2542|2565|3248|1&_RAR=arrow|3544|3202|2982|2701|1&_RTX=this%20is%20a%20collaborative%20element|3544|3058|5229|3787|13176|171,448

Listing 3: XML -- Document, Zoom Level, and Position + Markup Consisting of Circle, Arrow, and Text Box
```
<?xml version="1.0" encoding="ISO-8859-1"?>

<!DOCTYPE collaborative-content
  PUBLIC "-//Digital Paper, Corp..//DTD Collaborative Content 1.0//EN" "http://xml.digitalpaper.com/dtds/web-app_2.2.dtd"">

<collaborative-content>
  <dp-document >
    <docid>00016J</docid>
    <zoomlevel>78</dp-zoomlevel>
    <xpos>3498</xpos><ypos>2819</ypos>
  </dp-document>
  <collaborative-elements>
    <element-circle name="circle" visible="yes"><ul-point>2140,2542</ul-point><lr-point>2565,3248</lr-point></element-circle>
    <element-arrow name="arrow" visible="yes"><ul-point> 3544,3202 </ul-point><lr-point> 2982,2701 </lr-point></element-arrow>
    <element-text name="this is a collaborative element" visible="yes"><ul-point> 3544,3202 </ul-point><lr-point> 2982,2701 </lr-point></element-arrow>
  </collaborative-elements>
</collaborative-content>
```

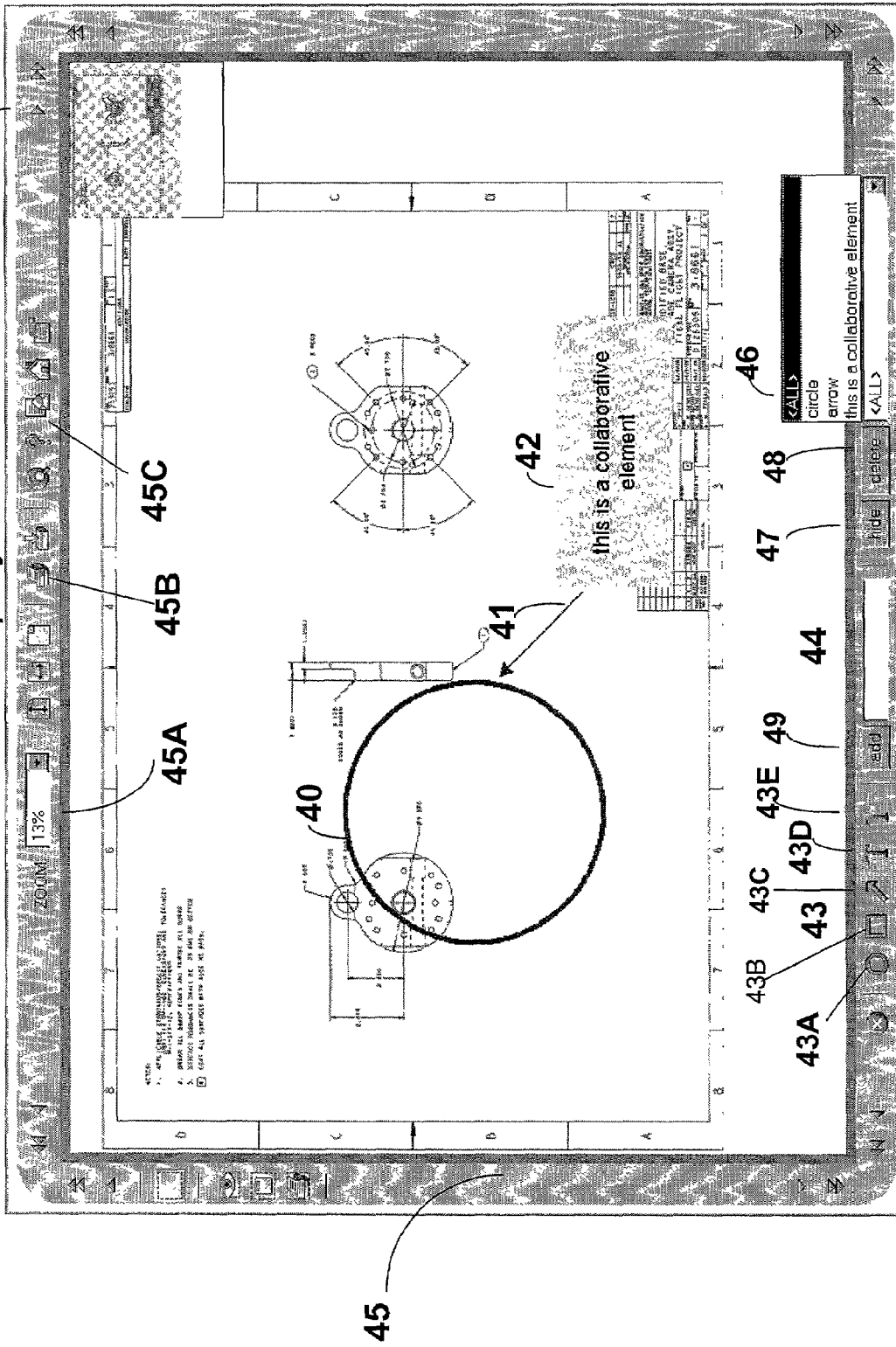
Figure 6: Preferred Embodiment: Client Workstation Screen Display

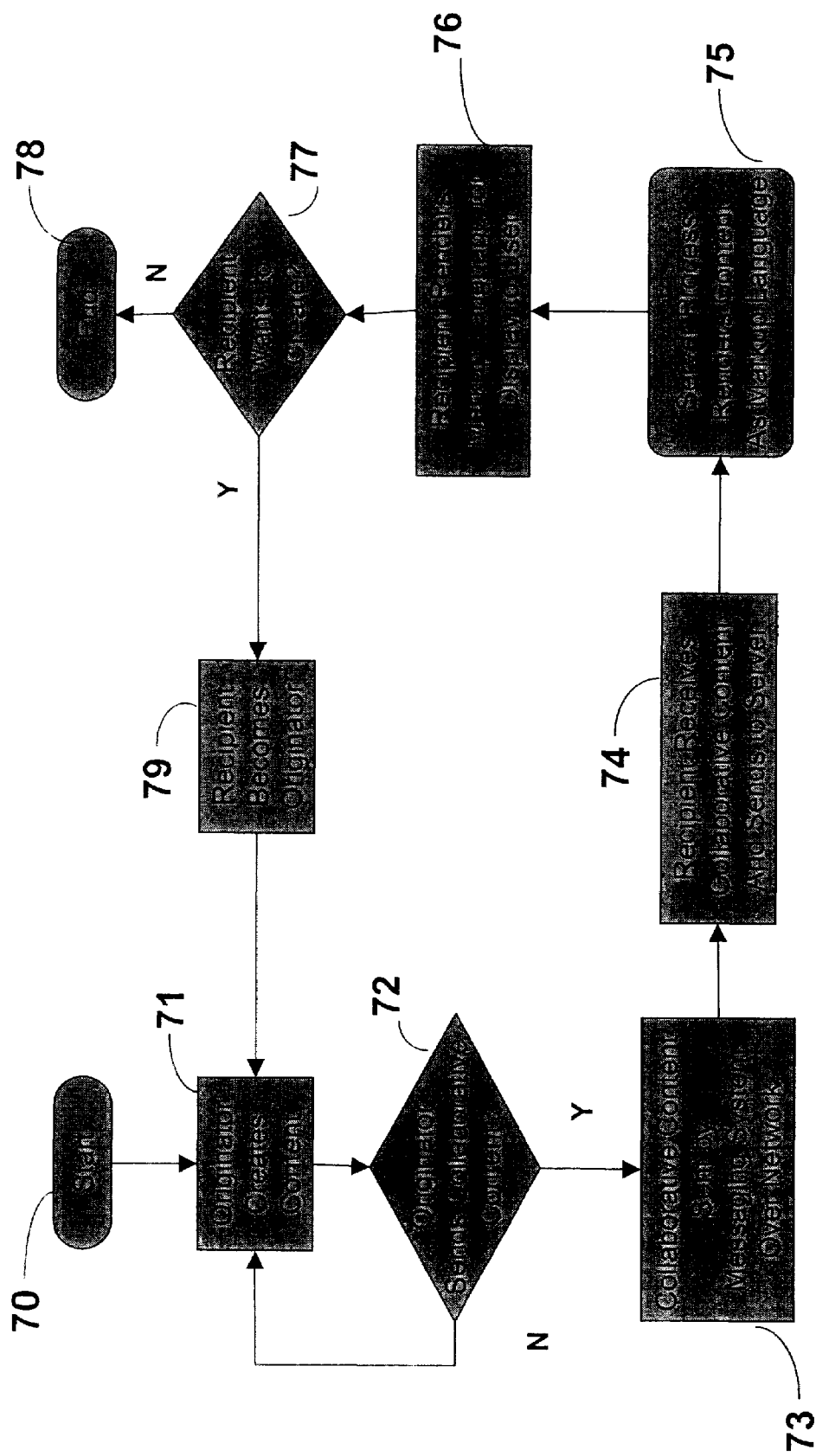
Figure 7: Preferred Embodiment: Flow of Events

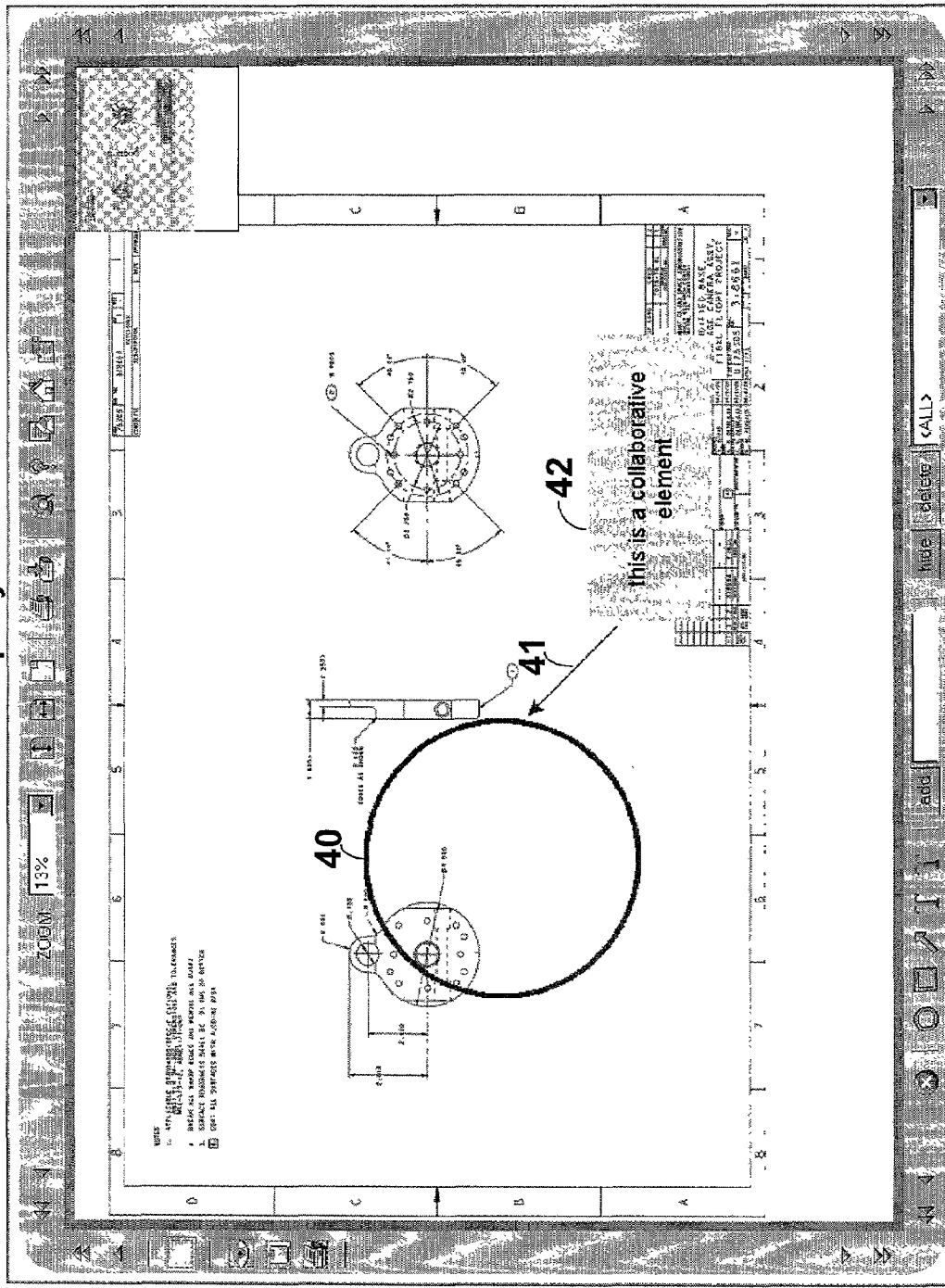

SYSTEM AND PROCESS FOR NETWORK COLLABORATION THROUGH EMBEDDED ANNOTATION AND RENDERING INSTRUCTIONS

FIELD OF THE INVENTION

The present invention relates generally to the field of communication, and more particularly, to collaborative communication. Still more particularly, the present invention relates to a process for network collaboration through embedded annotation and rendering instructions.

BACKGROUND ART

The ability of people to effectively and efficiently share ideas, i.e., collaborate, is at the core of team productivity. The advent of the computer and information networks facilitates collaboration over long distances and between large groups of people. Collaboration in a complex manufacturing process is particularly important, since large numbers of people are involved in the manufacture of an item or product assembly, and small errors in product specification development can result in financial loss to the manufacturer, time spent in rework, and possible harm to human life.

Because of the large costs associated with errors, the manufacturing industry has always used elaborate processes for the creation, revision, management, and deployment of manufacturing specifications. The construction of large, labor-intensive projects, and more recently, small, high volume manufacturing, typically consists of multiple cycles of review and approval. Once approved for production, a design must be kept current, and revision control must be maintained to ensure that the correct part, from the appropriate drawing, is manufactured every time. Even with the right system in place, effective communication is time critical. For example, delivering a new specification to the manufacturing plant a day late can cost millions of dollars in scrap and rework.

An important goal of any manufacturing process is to reduce and eliminate human error in design and production. There are many opportunities for error since the design specification passes through many hands during the design phase. Unfortunately, there have been few beneficial critical changes in connection with the approval and review process, apart from the technology used to convey the information from one party to another. Historically, paper and written documentation represented the first major step in conveying complex ideas among people. A review and approval bureaucracy introduced responsibility and accountability into the process. The next significant step was the introduction of configuration management, in which changes to specifications are recorded, saved, and each version of a document is given a new revision identifier.

The basic elements described above have remained the state-of-the-art for many years. Recently, improvements in technology have served three purposes in the area of collaboration: to reduce the time between communications over long distance, enable more people to participate in the communications, and improve the accuracy of the communications.

Most collaboration systems are self-contained within a network. In other words, the collaboration system is used to send email, pictures, voice, or other media over the network. Since the system is self-contained, it has broad use but can be difficult to incorporate into existing processes. One example is using email to discuss revisions to a document. The participants in the collaboration must reference the document (usually contained in a separate system or file), then refer to the email, reply to the email, and await a response from the other collaborators.

Certain advances have been made wherein the collaborative content (in this case, a document) could be "attached" to the email, enabling collaborators to refer to a modified document embedded in the collaboration message. However, even this arrangement involves two applications: one for messaging and one for editing and viewing the collaborative content. When using email attachments to send documents, the entire collaborative content is delivered with the message.

The Internet provides an approach (using Hypertext Markup Language (HTML) documents and the Hypertext Transport Protocol (HTTP)) for sharing documents among multiple recipients over long distances, facilitated by the use of Uniform Resource Locators (URLs) which allow collaborators to reference a common document. Since the content of the Internet is not directly modifiable by a client, any changes need to be accomplished by directly modifying the content and re-posting the document on the server.

In order to effectively collaborate over long distances, a collaboration system must satisfy two objectives: first, a way must be found for collaborators to view the same collaborative content, regardless of their location; and second, a way must be provided to communicate opinions, changes, and illustrate points of interest in connection with the collaborative content. Ideally, this system should not require installation of custom software to accomplish these tasks because the installation of extra software introduces problems with licensing, portability, and availability to all collaboration participants.

A number of approaches have been developed to accomplish these objectives.

According to one collaborative approach, most modern documentation is generated, edited, and stored using electronic means. In a typical case, the document author creates a document using a generation tool, such as a computer-aided design (CAD) program or word processor. Once generated, the document is stored in the "native" format of the generation tool on persistent media (magnetic media, optical media, punched cards, or other). Changes to the document involve editing the native file using the generation tool. If someone other than the author intends to modify the document, that person will need a copy of the document file and software capable of modifying the file (usually the generation tool). Coordinating changes between copies of the document requires configuration management (CM) tools and procedures.

The overhead support involved in generating, editing, storing, and controlling large numbers of these documents is large. The software used for creating drawings (CAD systems) is very expensive and difficult to learn. The CM tools require constant supervision and strict processes to work correctly. The act of sending a document from one reviewer to another can involve long delays and loss of control of the original document.

The most popular collaboration solution, i.e., email and attachments, has several disadvantages. When sending collaborative content to another collaborator, the entire source of the content must be sent as well. This creates a much larger message size, and can impose a burden on collaborators with low-bandwidth connections. This solution also presents problems with security, since many holders of intellectual property do not want full copies of that property sent to collaborators outside their security perimeter, especially over a low-security medium, such as email. Lastly, in order to view and edit the collaborative content, all collaborators must have access to an application that views and edits that content. This is impractical for client workstations with small computing power (such as PDAs or Cell Phones), or for the collaborator that does not wish to purchase a license for potentially expensive software.

The use of internet hosting of files and an Internet Browser (free of plug-ins or other native code installations) solve the accessibility problems, but does not allow the collaborators to make annotations (collaborative elements) with respect to the collaborative content, or share these annotations with other collaborators. For example, even if hundreds of collaborators can view an HTML document referenced by a URL, none of these collaborators have the ability to mark up the page for the others to see. While it is possible to create an application that could accomplish this objective, an installable (and/or licensable) application presents some of the same problems as the email with attachments solution described above.

As described above, there is a need in the collaboration industry to allow collaboration between networked computer users without requiring a dedicated collaboration application on the user's computer system. There is a further need to allow the annotation of internet web pages without altering the original page or requiring a dedicated collaboration application on the user's computer system.

Further still, it would be useful to allow the rendering of the collaborative content without requiring a dedicated collaboration application on the user's computer system. Additionally, there is a need to allow the rendering of the collaborative content exactly as it appeared during annotation of the content, or at the very least, substantially as it appeared during annotation of the content.

A further need is to provide for the transmission of the collaborative content and the subject drawing by exchanging the URL of the content, and rendering instructions as part of that URL.

DISCLOSURE/SUMMARY OF THE INVENTION

It is therefore an object of the present invention to allow collaboration between networked computer users without requiring a dedicated collaboration application on the user's computer system.

Another object of the present invention is to allow the annotation of internet web pages without altering the original page or requiring a dedicated collaboration application on the user's computer system.

Still another object of the present invention is to allow the rendering of the collaborative content without requiring a dedicated collaboration application on the user's computer system.

A further object of the present invention is to allow the rendering of the collaborative content substantially as it appeared during annotation of the content.

A further object of the present invention is to allow the rendering of the collaborative content exactly as it appeared during annotation of the content.

Yet another object of the present invention is to provide for the transmission of the collaborative content and the subject drawing by exchanging the URL of the content, and rendering instructions as part of that URL.

The above described objects are fulfilled by a system and process of network collaboration through embedded annotations and rendering instructions enabling collaborators to generate, share or transmit, and render collaborative content over the internet without installing any applications other than a web browser. The recipients of such collaborative content may view the content without installing any application other than the web browser. The message sent between collaborators is a URL, which not only contains the identity of the base document but also includes an encoded representation of the collaborative content added to the base document by a collaborator. The URL is self-contained, and can be distributed using synchronous or asynchronous messaging systems.

Most current collaboration systems assume that all collaborators will be present at the same time to interact. The present invention is capable of providing non-real-time collaboration as well, e.g., the URL can be posted on message boards, news groups, or other asynchronous messaging systems.

A process for network collaboration through embedded annotation and rendering instructions that allows for the composition, transmission, and rendering of collaborative content, in accordance with the present invention comprises composing collaborative content including one or more collaborative content elements, any number of client workstations equipped with an internet browser capable of composing said collaborative content, any number of client workstations equipped with an internet browser capable of displaying and rendering said collaborative content, a server process capable of receiving requests for the said collaborative content, and returning the rendered content, a transport mechanism for conducting the exchange of information between originator and server, and receiver and server, and a messaging system for the peer-to-peer exchange of content URLs.

In accordance with a method aspect of the present invention, a computer-implemented method of network collaboration through embedded annotation and rendering instructions to generate, transmit, and render collaborative content is disclosed. The method includes the steps of generating collaborative content including a base document and at least one collaborative content element, rendering the collaborative content, and transmitting the collaborative content between client workstations. A further step may include annotating the collaborative content by adding another collaborative content element. Advantageously, no dedicated software is needed for the client workstation and the client workstation may be a personal computer equipped with Internet browser software, a mobile communication device with a graphical or textual display, and a personal digital assistant equipped with a hypertext viewer. Further advantageously, the collaborative content transmitted to a client workstation need only include a URL and rendering instructions to enable a user to view the collaborative content.

In accordance with an apparatus aspect of the present invention, a network collaboration tool using embedded annotation and rendering instructions is disclosed. The tool includes a web browser software for displaying collaborative content, a graphical collaboration tool for generating a collaborative content element on the collaborative content and for transmitting the collaborative content element, and a server process. The server process receives the generated collaborative content elements, renders the collaborative content in combination with the collaborative content elements, and generates a combined collaborative content including collaborative content elements for display by the web browser. The tool includes a toolbar having an add circle tool, an add rectangle tool, an add arrow tool, an add text tool, and an add text highlight tool.

In a system aspect of the present invention, a network collaboration system using embedded annotation and rendering instructions is disclosed. The network collaboration system includes a processor for receiving and transmitting data and a memory coupled to the processor. The memory has sequences of instructions stored which, when executed by the processor, cause the processor to generate a collaborative content including a base document and a collaborative content element. The instructions further cause the processor to render the collaborative content and transmit the collaborative content between client workstations. Further instructions cause the processor to annotate the collaborative content by adding another collaborative content element. Uniquely, the system does not require dedicated, persistent software be installed on a client workstation and the client workstation may be a personal computer equipped with Internet browser software, a mobile communication device with a graphical or textual display, or a personal digital assistant equipped with a hypertext viewer. Advantageously, the messaging system for transmitting the collaborative content may be an email system, an electronic news or bulletin-board system, or a mobile paging system. Further, the messaging system may use either synchronous or asynchronous messaging.

In a client system aspect, a network collaboration system is disclosed which includes a collaborative content and a graphical collaboration tool. The graphical collaboration tool is downloadable from a server and generates, transmits, and renders the collaborative content. In response to a user manipulating the graphical collaboration tool, the tool transmits a representation of the collaborative content element and the reference to the collaborative content to a server and receives the collaborative content including the collaborative content element.

In a server system aspect, a network collaboration system is disclosed including a collaborative content and a server process. The server process responds to user requests including a request for collaborative content, a graphical collaboration tool, collaborative content including an added collaborative content element, and collaborative content including a modified collaborative content element. Advantageously, the server process may be a common gateway interface script accessible by client workstations over a network.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 2 is a schematic block diagram of the invention, using a server model (this model is used in the preferred embodiment of the invention);

FIG. 3 is another schematic block diagram of the invention, using a peer-to-peer model;

FIG. 4 is a schematic block diagram of the preferred embodiment of the present invention;

FIG. 5 is a listing of a sample of collaborative content, as represented by a URL;

FIG. 6 is a display of an interface for generating collaborative content elements as displayed on a client workstation screen;

FIG. 7 is a high level functional flow of control of an embodiment of the process of the present invention; and FIG. 8 is a display of the collaborative content of FIG. 6 as displayed to a recipient.

BEST MODE FOR CARRYING OUT THE INVENTION

Figure 1:
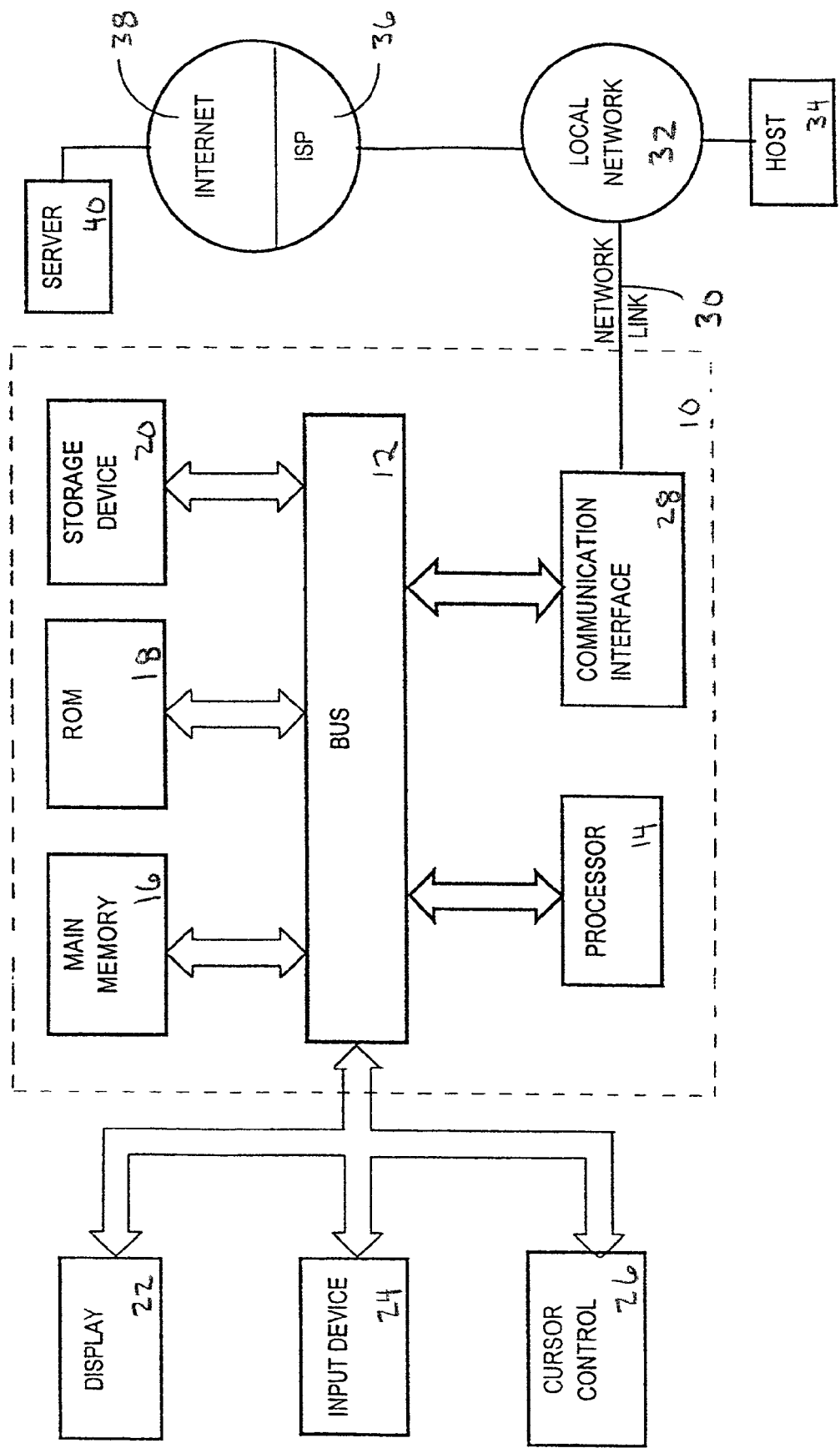
FIG. 1 is a high level functional diagram of a computer system useable with an embodiment of the present invention.

A method and apparatus for network collaboration through embedded annotation and rendering instructions are described. In the following description, for purposes of explanation, numerous specific details are set forth in order to provide a thorough understanding of the present invention. It will be apparent; however, that the present invention may be practiced without these specific details. In other instances, well-known structures and devices are shown in block diagram form in order to avoid unnecessary detail and obscuring the present invention.

Top Level Description

The present invention is a system and process for network collaboration using embedded annotations and rendering instructions to enable collaborators to generate, share or transmit, and render collaborative content over the internet. Collaborators are able to view, generate, and render the collaborative content without installing any application software on their computer systems other than a web browser. Recipient collaborators may view the content by installing only a web or Internet browser on their computer system. Collaborators may share the collaborative content by transmitting a message including a URL, which not only contains the identity of the base document but also includes an encoded representation of the collaborative content added to the base document by a collaborator. The URL is self-contained, and can be distributed using synchronous or asynchronous messaging systems.

DETAILED DESCRIPTION

A detailed description of the present invention is now provided.

Hardware Description

FIG. 1 is a block diagram of an exemplary computer system 10 upon which an embodiment of the invention may be implemented. The present invention is usable with currently available personal computers, workstations, servers, mini-mainframes and the like.

Computer system 10 includes a bus 12 or other communication mechanism for communicating information, and a processor 14 coupled with the bus 12 for processing information. Computer system 10 also includes a main memory 16, such as a random access memory (RAM) or other dynamic storage device, coupled to the bus 12 for storing information and instructions to be executed by processor 14. Main memory 16 also may be used for storing temporary variables or other intermediate information during execution of instructions to be executed by processor 14. Computer system 10 further includes a read only memory (ROM) 18 or other static storage device coupled to the bus 12 for storing static information and instructions for the processor 14. A storage device 20, such as a magnetic disk or optical disk, is provided and coupled to the bus 12 for storing information and instructions.

Computer system 10 may be coupled via the bus 12 to a display 22, such as a cathode ray tube (CRT) or a flat panel display, for displaying information to a computer user. An input device 24, including alphanumeric and other keys, is coupled to the bus 12 for communicating information and command selections to the processor 14. Another type of user input device is cursor control 26, such as a mouse, a trackball, or cursor direction keys for communicating direction information and command selections to processor 14 and for controlling cursor movement on the display 22. This input device typically has two degrees of freedom in two axes, a first axis (e.g., x) and a second axis (e.g., y) allowing the device to specify positions in a plane.

The invention is related to the use of a computer system 10, such as the illustrated system, to provide a process for network collaboration through embedded annotation and rendering instructions. According to one embodiment of the invention, a collaborative content web page is provided by computer system 10 in response to processor 14 executing sequences of instructions contained in main memory 16 to display a web page for collaboration. Such instructions may be read into main memory 16 from another computer-readable medium, such as storage device 20. However, the computer-readable medium is not limited to devices such as storage device 20. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 16 causes the processor 14 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 10 also includes a communication interface 28 coupled to the bus 12. Communication interface 18 provides a two-way data communication as is known. For example, communication interface 28 may be an integrated services digital network (ISDN) card or a modem to provide a data communication connection to a corresponding type of telephone line. As another example, communication interface 28 may be a local area network (LAN) card to provide a data communication connection to a compatible LAN. In the preferred embodiment communication interface 28 is coupled to a virtual blackboard. Wireless links may also be implemented. In any such implementation, communication interface 28 sends and receives electrical, electromagnetic or optical signals which carry digital data streams representing various types of information. Of particular note, the communications through interface 28 may permit transmission or receipt of the operating software program scheduling information. For example, two or more computer systems 10 may be networked together in a conventional manner with each using the communication interface 28.

Network link 30 typically provides data communication through one or more networks to other data devices. For example, network link 30 may provide a connection through local network 32 to a host computer 34 or to data equipment operated by an Internet Service Provider (ISP) 36. ISP 36 in turn provides data communication services through the world wide packet data communication services through the world wide packet data communication network now commonly referred to as the "Internet" 38. Local network 32 and Internet 38 both use electrical, electromagnetic or optical signals which carry digital data streams. The signals through the various networks and the signals on network link 30 and through communication interface 28, which carry the digital data to and from computer system 10, are exemplary forms of carrier waves transporting the information.

Computer system 10 can send messages and receive data, including program code, through the network(s), network link 30 and communication interface 28. In the Internet example, a server 40 might transmit a requested code for an application program through Internet 38, ISP 36, local network 32 and communication interface 28. In accordance with the invention, one such downloaded application provides for generating and viewing collaborative content, as described herein.

The received code may be executed by processor 14 as it is received, and/or stored in storage device 20, or other non-volatile storage for later execution. In this manner, computer system 10 may obtain application code in the form of a carrier wave.

Functional Description

The following is a description of a method and apparatus for network collaboration through embedded annotation and rendering instructions, containing a schematic overview of two possible implementations, a preferred embodiment, and alternate embodiments. It is assumed the reader is familiar with the concepts of clients, servers, messaging, and computer networks.

Referring first to FIG. 2, there is shown a conceptual block diagram of the present invention. This schematic assumes the invention is implemented using a server model. The server model includes a client workstation, e.g., computer system 10 (FIG. 1), for generating, rendering, and transmitting collaborative content, i.e., originator 50, over a messaging system 51 to a client workstation for receiving and viewing collaborative content, i.e., receiver 52. The client workstations 50, 52 include operating software and internet or web browser software, e.g., Microsoft Internet Explorer or Netscape Navigator, as is known in the art.

In the server model, the server process 53 is executing separately, i.e., on a separate computer system 10 (FIG. 1), from the originator 50 and receiver 52 client workstations. All communication between the server process 53 and client workstations 50, 52 is by way of the transport mechanism 54, usually a computer network. The encoded collaborative content is transmitted from the originator 50 to the receiver 52 using the messaging system 51. In an alternate configuration, the messaging system 51 may reside on the server 53. The base content, i.e., the content upon which the annotations are to be added, is stored in a persistent base document storage 55, e.g., storage device 20.

FIG. 3 is a block diagram of the present invention using a peer-to-peer model. In the peer-to-peer model, server processes 60, 62 are executing on the originator 50 and receiver 52 client workstations. The base content is persistently stored in a location that is network accessible by both peers, i.e., persistent base document storage 55. Using the peer-to-peer model allows the client workstations 50, 52 to collaborate directly over the messaging system 51 using a transport mechanism 64 only for access to document storage 55. Advantageously, the server processes 60, 62 are accessed without requiring use of transport mechanism 64 enabling faster server response and rendering times for the respective originator 50 and receiver 52.

FIG. 7 is a functional flow diagram of the process of the generation, delivery, and rendering of collaborative content using a computer system 10, e.g., originator 50, in accordance with the embodiment of the invention shown in FIG. 2. This process is the same for all embodiments of the invention and begins at step 70. The user has manipulated either/or cursor control 26 and input device 24 to cause the execution of an internet browser software on computer system 10, e.g., originator 50, and has directed the browser to the URL locating the content to be collaborated upon by the user. The flow of control proceeds to step 71 wherein the user at originator 50, manipulates cursor control 26 and/or input device 24 to generate a collaborative element as part of the overall collaborative content, e.g., a redline markup on a drawing. The user at originator 50 may decide to create another collaborative element, or send the encoded collaborative content to the server 53 for distribution to another user at another computer system 10, e.g., receiver 52, at step 72. If the server process 53 sends the collaborative content to the receiver 52 via the messaging system 51, the flow proceeds to step 73. If not, the flow returns to step 71. At step 73, the collaborative content is sent using the messaging system 51 from originator 50 to receiver 52.

Once the collaborative content is received by the receiver 52 at step 74, the receiver 52 sends the collaborative content to the server process 53 where it is rendered at step 75 by the server 53 to a markup language for rendering and display at step 76 by receiver 52 using display 22. The user at receiver 52 then decides at step 77 whether to end the process and proceed to step 78, or to become an originator 50 at step 79 and create collaborative content at step 71 and send it to the prior originator 50 or another collaborating user. At step 79, the receiver 52 takes on the role of originator 50 and has the ability to create a collaborative element. The process continues until the recipient of the content decides not to send further collaborative content and the flow proceeds to step 78.

In accordance with a preferred embodiment of the present invention, FIG. 4 is a schematic of an implementation of the present invention based on the server model first introduced in FIG. 2 including an originator 80 using a messaging system 81 to transmit collaborative content to a receiver 82. Both originator 80 and receiver 82 client workstations are represented by personal computers running a multimedia Internet browser software supporting a client-side scripting language, such as JScript or Javascript, and Dynamic HTML elements. The role of the client workstations is to allow the interactive creation of collaborative content, and presentation of the content as delivered by a server process 84. In the preferred embodiment, the client-side scripting language is used to improve the user interaction with the workstation 80, 82 and give visual cues to aid in creating a collaborative element, as described below. It is the responsibility of the server process 84 to receive an encoded representation of the collaborative content (as a URL) and render the content, e.g., in a common gateway interface (CGI) process, for presentation on one of the client workstations 80, 82. The messaging system (51 of FIG. 2) of the preferred embodiment is an electronic mail (email) system 81, e.g., simple mail transport protocol (SMTP). The transport mechanism (54 of FIG. 2) is hypertext transport protocol (HTTP) over transmission control protocol/internet protocol (TCP/IP) 83.

FIG. 6 shows the originator 50 client workstation screen display 22 and the environment used to generate collaborative elements within a browser window. The browser window includes a document viewer, e.g., DocQuest available from Digital Paper, Inc., for viewing large format drawings over the Internet. The document viewer includes a border 45 having controls for manipulating the user's view of a document or content, e.g., a zoom control 45A for controlling the zoom level at which the user view's the content, a print control 45B for printing a paper copy of the content, an email control 45C for sending the content via email to a recipient, and a scroll right control 45D for scrolling the user's content view toward the right-hand portion of the content. The collaboration tools, buttons, and fields make up a graphical collaboration tool.

The border 45 further includes a toolbar 43 having tools enabling the user to add collaborative content to the content in the document viewer. The user at originator 50 selects a tool from the toolbar 43, and "draws" the element of the type selected by interacting with the client workstation. The toolbar 43 includes an add circle tool 43A, an add rectangle tool 43B, an add 45-degree arrow tool 43C, an add text tool 43D, an add highlight tool 43E, and a name text tool 43F. For each of the tools (43A-43E), a user selects a first position on the display by activating cursor control 26, e.g., clicking a mouse button, and selects a second position on the display, by again activating cursor control 26, to indicate the end point and define the size of the collaborative element. The collaborative element position and extent is thus defined.

In an alternate embodiment, the first and second positions may be defined by a "click and drag" approach in place of the two click method described above. Using the click and drag approach, the first position is specified by the location of the initial pressing or activation of the cursor control 26 without release and the second position is specified at the release point of the cursor control 26.

Specifically, with reference to the add circle tool 43A, the first point is the center of a circle and the second point determines the radius of the circle. When using the add rectangle tool 43B, the first point is one corner of a rectangle and the second point determines the location of the diagonally opposite corner of the rectangle. The first point of the add 45-degree arrow tool 43C is the location of the tail of an arrow and the second point is the location of the tip of the arrow. The arrow is drawn at a 45 degree angle, with respect to the vertices of the display, from the first point to the second point and the distance between the first and second points determines the arrow size. The add text tool 43D functions similarly to the add rectangle tool 43B adding an additional step of prompting the user, via an on-screen dialog box, for the text forming the collaborative element. With reference to the add highlight tool 43E, the tool functions similar to the add rectangle tool 43B; however, the rectangle created is translucent allowing the user to view the content through the highlight region. With a collaborative element selected on the display 22, the user may name the element by entering a name in name text tool 43F.

A drop-down element list 46 is located to the right of toolbar 43 and used to select one or all of the collaborative elements added to the content. With a collaborative element selected on the display 22 using the drop-down element list 46, a hide button 47 or a delete button 48 may be manipulated by a user using cursor control 26 to cause the selected collaborative element to be hidden or deleted, respectively. All collaborative elements may be hidden or deleted in this manner.

During this "drawing" process, the client workstation prompts and gives feedback to the originator 50 using graphical display devices such as cursors, icons, and marquee boxes. For example, the drawing of a circle 40, as described above in connection with the add circle tool 43A, involves selecting a center point followed by the selection of a point on the circle radius. An arrow 41 is added by the user specifying the end point followed by the start point of the arrow indicating to what the arrow is pointing. A text box 42 is added by the user activating the add text tool 43D and specifying a first corner point of the rectangle followed by the second corner point of the rectangle and finally entering the text to be displayed within the text box 42 in a dialog prompt. The user may also enter a name for each collaboration element in name text tool 43F, and submit each element for rendering to the server process 53 by activating an add button 49.

Activation of the add button 49 causes the executing software, i.e., client-side scripting in the browser, to submit the encoded collaborative content to the server process 53 to render the content for return to the originator 50. The server process 53 receives the URL of the content on which a user is adding a collaborative element and the encoded collaborative content corresponding to the collaborative element added by the user, as described above using the tools (43A-F) of the toolbar 43. The server process 53 interprets commands and data, i.e., rendering instructions, embedded in the encoded collaborative content to determine the type, position, and other attributes of the collaborative element with respect to the content. The collaborative element, e.g., arrow 40, is then rendered as additional HTML to be included with the content and transmitted to the user at originator 50 for rendering by the browser software on display 22. The server process 53 determines the position of each collaborative element with respect to the overall content and renders the collaborative element at the correct position. That is to say, because of a user's manipulation of the zoom level control 45A and the scroll right control 45D, a different portion of the content may be viewed by the user; however, the collaborative content will properly be rendered at the position it was originally drawn.

Each time the server process 53 completes the rendering task, the HTML page is returned to the originator 50 client workstation, and displayed on the display 22, and even more importantly, the encoded collaborative content is stored in the URL of the HTML page or content. When the user at originator 50 is finished constructing the collaborative elements, he may send the encoded content (in this case, the URL) to a receiver 52 client workstation using the messaging system 51 by pressing the "send" button 45C. The send button 45C transmits the URL including the URL of the content and the encoded collaborative elements to another user. It is to be understood that even though an email embodiment has been described, the present invention is usable with other forms of message or content transmission, e.g., file transfer protocol, telnet, chat, or instant messaging.

FIG. 5 shows a sample of the encoded collaborative content as produced by the preferred embodiment (Listing 1 and 2) and an alternate XML implementation (Listing 3). The complete encoding consists of URL part one (Listing 1) followed immediately by URL part two (Listing 2). URL part one contains the base document or content identifier, its location on a document repository, e.g., persistent base document storage 55, and detailed viewing information. The detailed viewing information specifies the zoom level and position of the view on the particular drawing. Part one of the URL refers to the base document, and is not altered by the collaboration process.

URL part two contains the encoded annotations. In this example, the content includes three collaborative elements: a red circle, a red arrow, and a text area containing the text: "this is a collaborative element". The complete URL as specified by parts one and two is:

http://localhost/dpr/ds.dpv/00016J/1/
123?dpv=bt7dc0dm1dn1do1e0h5i6800j4400k25610n
2441o25p1r0s33st0t0tt0w7x896xm0xt7y640ym0yt5&
DPDB_IDNT=/GIBBS/00 016J/1&DPDB_SH=
04131&_RCR=circle|240|2542|2565|3248|1&_RAR=
arrow|3544|31 2|2982|2701|1&_RTX=this%20is%20a
%20collaborative%20element|3544|3058|5229787
|13176|1?1,448 and is sent via email (the preferred embodiment messaging system 51) to the recipient client workstation, where it is rendered as HTML (the preferred embodiment markup language) by the server process 53. An alternate representation of the collaborative content is in extensible markup language (XML) (Listing 3 of FIG. 5). The resulting HTML is sent to the recipient client workstation, and is displayed through the internet browser software. A display resulting from the URL introduced in FIG. 5 is shown in FIG. 8. The recipient client workstation display is identical to the display as seen by the originator client workstation.

FIG. 6 shows the display of the rendered HTML on a client workstation. Note that the collaborative elements have been rendered exactly as they were generated by the originator 50 client workstation. The collaborative elements shown here, i.e., circle 40 and arrow 41, are "canned" graphical images stored by the server process 53 in storage device 20. The canned images are accessible via HTTP as images, and properly positioned and sized by the client workstations. The text box 42 is rendered by the server 53 as part of the HTML page, and does not require a canned image. The text for this element is entered using the add text tool 43D on the toolbar 43.

The advantage of the present invention is that the client workstations do not need any software installed other than an internet browser and an embedded scripting language. The only application software that needs to be installed is on server process 53. This architecture makes the collaboration process available to any device with an internet browser and server connectivity. This "zero footprint" client makes the solution very attractive for information technology (IT) departments, security personnel, support personnel, and mobile device users.

Alternate embodiments of the invention can be accomplished by using the peer-to-peer model introduced in FIG. 3. The advantage of the peer-to-peer method is that the transport mechanism (network) can be eliminated by embedding the server process in each client workstation. This means that the collaborative content can be rendered to HTML on the client itself.

Alternate client workstations comprise PDAs, cell phones, handheld organizers, Palm devices, Pocket PCs, mobile pagers, and Internet appliances. The use of handheld devices and cell phones is especially attractive, since they already contain a messaging system (such as an infra-red port or wireless communication protocol). The increasing computing capability of these devices make the peer-to-peer model very attractive.

Alternate messaging systems include NNTP (Network News Transport Protocol), computer bulletin boards, and enterprise synchronous/asynchronous messaging systems. The small size of the encoded content (FIG. 5), means that it can be sent efficiently over any of these systems, and the pure textual nature means that it can be sent safely through most network gateways.

While there have been described and illustrated specific embodiments of the invention, it will be clear that variations in the details of the embodiments specifically illustrated and described may be made without departing from the true spirit and scope of the invention as defined in the appended claims.

For example, even though a Javascript or dynamic HTML-based client has been described above for implementation of the graphical collaboration tool, it is to be understood that dedicated client application software, e.g., a Java application or applet, may be used to implement the graphical collaboration tool. The dedicated client software may execute within a browser or in a stand-alone mode on the client workstation.

Further, the message transmitted to the server 53 may be a message including a representation of the collaborative content elements and the collaborative content and is not limited to a URL, HTML or XML format. The message must contain a reference to the collaborative content and a representation of the collaborative content elements added to the collaborative content.

What is claimed is:

1. A computer-implemented method of network collaboration through embedded annotation and rendering instructions to generate, transmit, and render collaborative content, the method comprising the steps of:

generating by an originator client workstation a collaborative content including a base document having a document identifier that identifies a location of a content; and at least one collaborative content element that comprises at least one annotation therein and rendering instructions therefore so as to annotate said base document by embedding said at least one annotation and instructions therefore as an encoded representation of collaborative content and forwarding the collaborative content to a server for execution;

rendering by a server said collaborative content element to said base document in accordance with said rendering instructions, and providing said collaborative content to said originator client workstation for display.

2. The method as claimed in claim 1 further comprising the step of annotating said collaborative content by adding another collaborative content element.

3. The method as claimed in claim 2 wherein said annotating step comprises presenting annotation options to said client workstation.

4. The method as claimed in claim 2 wherein said annotating step comprises inputting a text element to name said collaborative content element.

5. The method as claimed in claim 2 wherein said annotating step comprises inputting at least one of a symbol, shape and a text input element to generate said at least one of a symbol, shape and a text as said collaborative element.

6. The method as claimed in claim 2 wherein said annotating step comprises providing a visual cue to indicate the state of said collaborative content.

7. The method as claimed in claim 6 wherein said visual cue comprises at least one of a marker, cursor, icon, and marquee box.

8. The method as claimed in claim 1 wherein said originator client workstation includes as least one of a personal computer equipped with internet browser software, a mobile communication device with a graphical or textual display, and a personal digital assistant equipped with a hypertext viewer.

9. The method as claimed in claim 1 wherein said originator client workstation includes a program execution capability comprising:

an interpreted software program;
a compiled software program; and
a software program executed by a virtual machine.

10. The method as claimed in claim 1 wherein said network is a peer-to-peer network, and the rendering step is performed on a server portion of said originator client workstation in said peer-to-peer network.

11. The method according to claim 1, further comprising the step of:

transmitting between said originator client workstation and at least one receiver client workstation a document identifier having said rendering instructions embedded therein and comprising said collaborative content.

12. The method as claimed in claim 11, wherein said transmitting step is initiated by a user selecting a visual element to transmit said collaborative content subsequent to said collaborative content being saved.

13. The method as claimed in claim 11, wherein said transmitting step is performed using a messaging system.

14. The method as in claim 13, wherein said messaging system includes at least one of:

an electronic mail system;
an electronic news or bulletin-board system; and
a mobile paging system.

15. The method as claimed in claim 11, wherein said transmitting step is performed using a transport mechanism including at least one of:

a wireless protocol;
a synchronous messaging protocol; and
an asynchronous messaging protocol.

16. The method as claimed in claim 11, wherein the collaborative content transmitted in said transmitting step includes a URL and rendering instructions.

17. The method as claimed in claim 1 further comprising the step of annotating said collaborative content by adding another collaborative content element by said at least one receiver client workstation.

18. The method according to claim 1, wherein the document identifier comprises a Universal Resource Locator (URL).

19. The method according to claim 1, wherein the document identifier comprises a Hypertext Markup Language (HTML)

20. The method according to claim 1, wherein the document identifier comprises an Extensible Markup Language (XML).

21. A system for network collaboration using embedded annotation and rendering instructions comprising:

a processor for receiving and transmitting data; and
a memory coupled to the processor, said memory having stored therein sequences of instructions which, when executed by said processor, cause said processor to generate a collaborative content including a base document having a document identifier that identifies a location of content of said base document, and at least one collaborative content element having an embedded annotation in said document identifier and rendering instructions therefore, to render the collaborative content in accordance with rendering instructions.

22. The system as claimed in claim 21 wherein said memory further comprises sequences of instructions which, when executed by said processor, cause said processor to annotate the collaborative content by adding another collaborative content element.

23. The system as claimed in claim 22 wherein said annotate instructions comprise presenting annotation options to a user at the client workstation.

24. The system as claimed in claim 22 wherein said annotate instructions comprise inputting a text element to name said collaborative content element.

25. The system as claimed in claim 22 wherein said, annotate instructions comprise inputting at least one of a symbol, shape and a text input element to generate said at least one of a symbol, shape and text as said collaborative element.

26. The system as claimed in claim 22 wherein said annotate instructions comprise providing a visual cue to indicate the state of said collaborative content.

27. The system as claimed in claim 26 wherein the visual cue comprises at least one of a marker, cursor, icon, and marquee box.

28. The system as claimed in claim 21 wherein the client workstation includes at least one of a personal computer equipped with internet browser software, a mobile communication device with a graphical or textual display, and a personal digital assistant equipped with a hypertext viewer.

29. The system as claimed in claim 21 wherein the client workstation includes a program execution capability comprising:
   an interpreted software program;
   a compiled software program; and
   a software program executed by a virtual machine.

30. The system as claimed in claim 21, wherein the rendering instructions are performed on a client workstation.

31. The system as claimed in claim 21 wherein the rendering instructions are performed on a server.

32. The system as claimed in claim 21 wherein said sequences of instructions include at least one of a client-side scripting language.

33. The system as claimed in claim 21 wherein said sequences of instructions include at least one of Javascript and dynamic HTML.

34. The system according to claim 21, further adapted for transmitting the collaborative content and rendering instructions therefore between client workstations.

35. The system as claimed in claim 34, wherein said transmit instruction is initiated by a user selecting a visual element to transmit the collaborative content subsequent to said collaborative content being saved.

36. The system as claimed in claim 34, wherein a transmit instruction is performed using a messaging system.

37. The system as claimed in claim 36 wherein the messaging system includes at least one of:
   an electronic mail system;
   an electronic news or bulletin-board system; and
   a mobile paging system.

38. The system as claimed in claim 34, wherein a transmit instruction is performed using a transport mechanism including at least one of:
   an internet protocol;
   a wireless protocol;
   a synchronous messaging protocol; and
   an asynchronous messaging protocol.

39. The system as claimed in claim 34, wherein the collaborative content transmitted includes a URL comprising the embedded annotation and rendering instructions.

40. The system according to claim 34, wherein the client workstations transmit collaborative content and rendering instructions via a server.

* * * * *

UNITED STATES PATENT AND TRADEMARK OFFICE
CERTIFICATE OF CORRECTION

PATENT NO. : 7,647,373 B2  Page 1 of 1
APPLICATION NO. : 09/804074
DATED : January 12, 2010
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1672 days.

Signed and Sealed this

Sixteenth Day of November, 2010

David J. Kappos
*Director of the United States Patent and Trademark Office*